Feb. 25, 1930.    F. W. BAKER    1,748,058
VEHICLE WHEEL
Filed Aug. 25, 1926    2 Sheets-Sheet 1
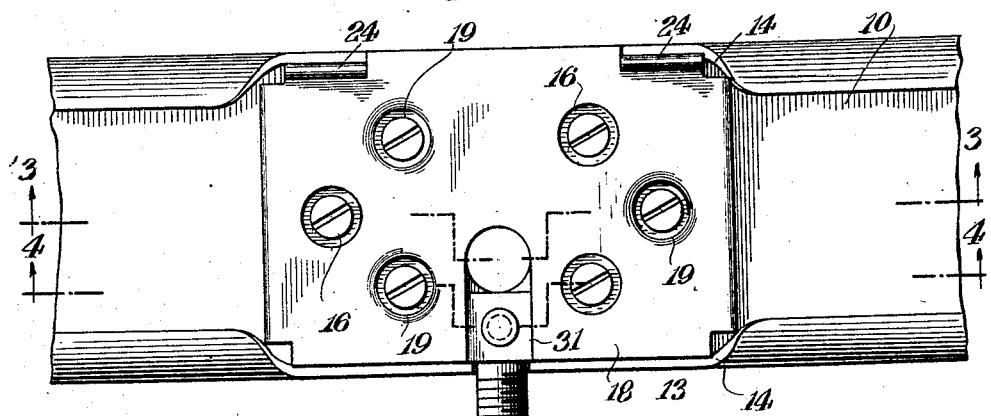
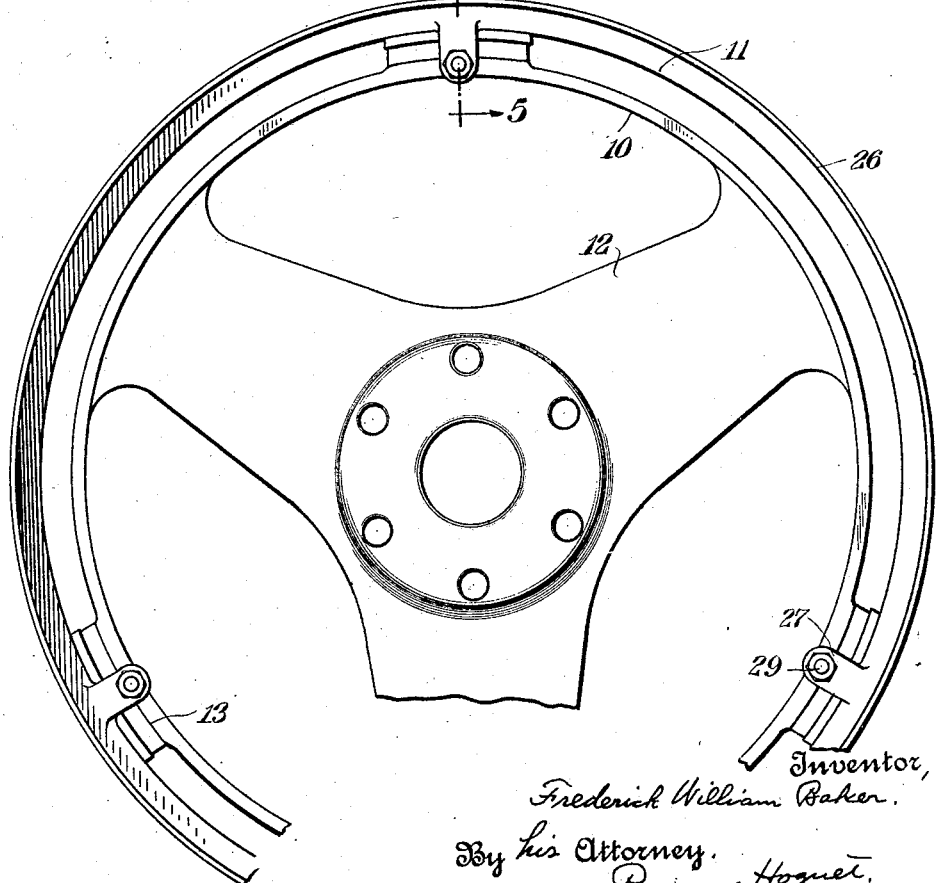
Inventor,
Frederick William Baker.
By his Attorney.
Ramsay Hoquet.

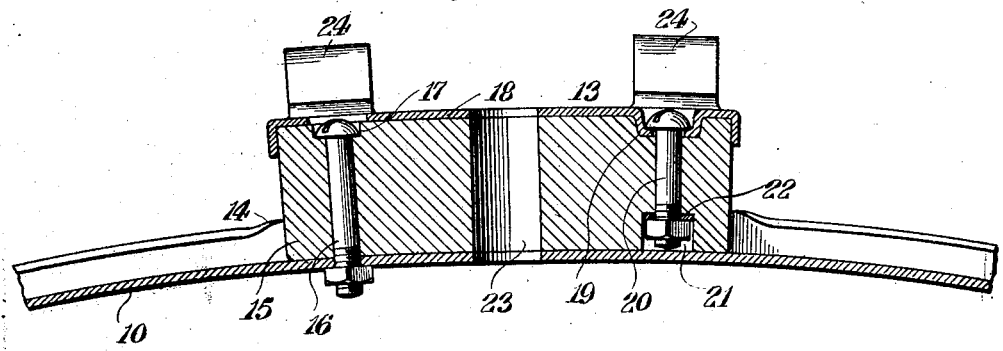
Fig. 3.
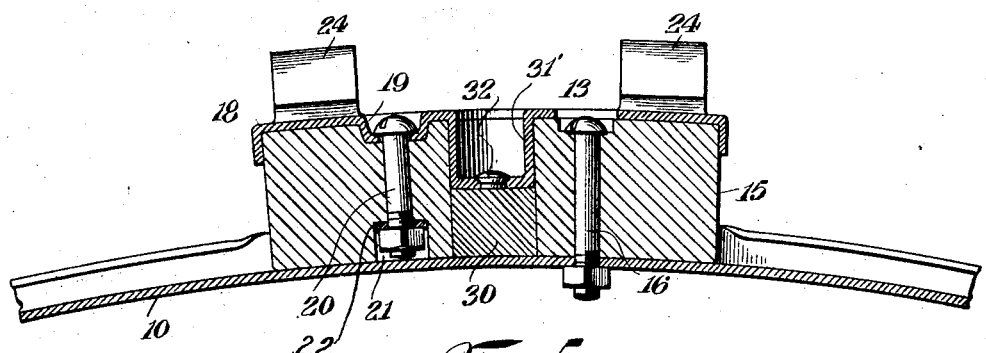
Fig. 4.
Fig. 5.
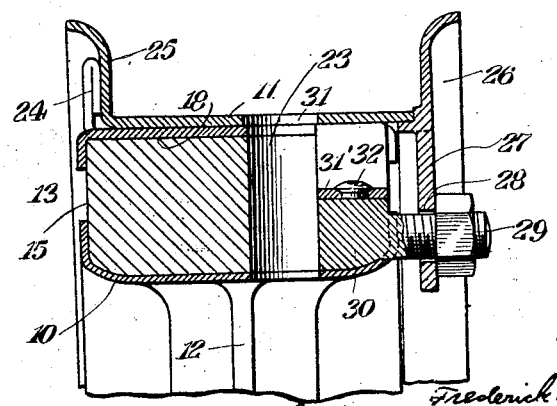
Inventor,
Frederick William Baker,
By his Attorney.
Ramsay Hoguet.

Patented Feb. 25, 1930

1,748,058

UNITED STATES PATENT OFFICE

FREDERICK WILLIAM BAKER, OF STOURBRIDGE, ENGLAND, ASSIGNOR TO TRINITY WHEEL CORPORATION, OF NEW YORK, N. Y., A CORPORATION OF NEW YORK

VEHICLE WHEEL

Application filed August 25, 1926. Serial No. 131,510.

My invention relates to improvements in vehicle wheels and more particularly to the kind of vehicle wheels having concentric rims spaced apart and with bearing members disposed between the rims to cushion the outer rim and to provide a resilient driving connection between the rims which will yield under torsional strain. The object of this particular invention is to produce a very simple, strong and efficient connection between the two rims which will have a limited but sufficient resilience between the rims, and which provides means for conveniently demounting or removing the outer or tire bearing rim. The invention is also well adapted to that type of wheel which has the inner rim provided with a spoke system disposed to leave spring sectors in the inner rim between the points where the spoke system connects with it.

Reference is to be had to the accompanying drawings forming a part of this specification, in which similar reference characters indicate corresponding parts in all the views.

Figure 1 is a fragmentary plan view of the inner rim and a resilient bearing member attached thereto.

Figure 2 is a fragmentary side elevation of the wheel.

Figure 3 is an enlarged detail section on the line 3—3 of Figure 1.

Figure 4 is a section on the line 4—4 of Figure 1, and

Figure 5 is a cross section on an enlarged scale on the line 5—5 of Figure 2.

The wheel has concentric rims 10 and 11, the inner rim 10 being connected with a spoke system which is preferably though not necessarily a three armed spoke system 12, like that illustrated, which leaves the inner rim with spaced sprngy sectors between the points where the spoke arms are attached. The bearing members which space and resiliently connect the two rims are spaced at intervals as shown in Figure 2, being located substantially midway of the spring sectors of the inner rim 10, so that the points of maximum rigidity in the outer rim 11 which will naturally be the points of connection 13, come opposite the points of maximum resilience of the inner rim which is located as stated. Thus it will be seen that in the outer rim there is a certain resilience or springiness between the points where the bearing members 13 are located, and that these points of resilience occur opposite the sides of the spoke system 12, while the non-rigid points come opposite the spring sectors of the inner rim 10 so that the structure as a whole has the resilience uniformly distributed, although the resilient points are not uniformly distributed in the two rim elements. This enables the wheel to be made so as to yield against all strains either torsional or otherwise and still be very light and strong.

To provide for the resilient demountable connections between the rims, the inner rim 10 has preferably at the points above indicated seats 14 in which the elements 13 are placed, and the walls of the seats take up much of the strain on these elements 13. Each element or bearing member 13 has a body 15 of resilient material which can be a laminated structure of textile fabric or otherwise, and each member or block 15 is rigidly attached to the inner rim by bolts 16 or the like, the heads being recessed as shown at 17 in the outer part of the body 15, while the nuts abut against the inner wall of the inner rim as shown clearly in Figure 3.

To provide for the demountable connection with the outer rim, the resilient body 15 is covered on its outer side by a cap 18 preferably of metal, and this is secured to the body 15 independently of the fastening 16, as for example by bolts 20, which engage countersunk parts 19 of the cap 18, and the nuts of which are in recesses in the inner wall of the body 15. A washer 22 can be placed in each recess 21 if desired. I have shown a hole 23 radially through the member 15 and this can be extended through the outer rim 11 as at 31 in Figure 5, so that if desired a tire valve stem can extend through the hole.

As a means of connecting the outer rim demountably to the bearing members, each cap 18 has at one side clips 24 which are arranged to engage the fixed flange 25 of the rim. The removable flange 26 can be connected to the body of the rim in any usual or preferred way, but I have shown a way which is suitable, convenient and strong. As here illustrated the flange 26 has clips 27 which are perforated as at 28, and receive bolts 29 having suitable nuts thereon. Each bolt connects with a head or block 30 which is held in a recess of the member 15 and is fastened by a pin 32 or the like to the part 31' which is bent downward or inward from the cap 18 and presses against the block 30, thus making a firm connection. It will be seen that when the nuts of the bolts 29 are removed, the flange 26 of the rim can be easily pulled off and the rim 11 and the tire which it bears can also be removed, or the tire can be removed separately from the rim.

It will be further noted that as the resilient members 15 connect rigidly and firmly with the inner rim, and likewise connect independently and demountably with the outer rim, the driving strain will be transmitted through these resilient members, and so the jolts and rigidity of the customary wheel when rotated are avoided.

I claim:—

1. A vehicle wheel having spaced concentric rims, resilient bearing members at spaced intervals between the rims rigidly attached to the inner rim, and a cap on each of the bearing members clipped at one side and bolted at its other side to the outer rim.

2. A vehicle wheel having spaced concentric rims and resilient bearing members at intervals between the rims, said members being fast to the inner rim, a cap on each of said members rigidly attached thereto, and clips on the cap to engage the outer rim and permit its detachment at one side only of the inner rim.

3. A vehicle wheel having spaced concentric rims with unitary resilient bearing members disposed at intervals between the rims, and rigidly fastened to the inner rim, a cap on each member rigidly attached thereto but independently of the inner rim, and a demountable connection between each cap and the outer rim to permit detachment of the latter at one side only of the inner rim.

4. A vehicle wheel having spaced concentric rims and unitary resilient bearing members rigidly attached to the inner rim at spaced intervals, a cap secured to each of the bearing members independently of the inner rim fastenings, and means on the cap for engaging opposite sides of the outer rim and permitting lateral detachment of the latter at one side only of the inner rim.

5. A vehicle wheel having spaced concentric rims the outer of which is demountable and has a part thereof detachable, resilient bearing members at intervals between the rims, a rigid connection between said members and the inner rim, a cap secured to each of the said bearing members independently of the inner rim fastenings, clips on one side of each cap to engage the outer rim, and a bolt projecting from the opposite side of each bearing member and connected with its cap for engaging the detachable part of the outer rim.

6. A vehicle wheel comprising an inner rim, a spoke system disposed to leave spring sectors of said inner rim, an outer rim spaced apart from the inner rim, unitary bearing members between the rims and opposite the spring sectors of the inner rim, fastenings extending through each member and connecting it to the inner rim only, a cap for each member, fastenings extending through each member and connecting it with its cap, and a separable connection between the cap and the outer rim.

In testimony whereof, I have signed my name to this specification this 19th day of August, 1926.

FREDERICK WILLIAM BAKER.